US007433170B2

(12) United States Patent
Lluch et al.

(10) Patent No.: US 7,433,170 B2

(45) Date of Patent: Oct. 7, 2008

(54) APPARATUS AND METHOD OF CONTROLLING THE CLOSING ACTION OF A CONTACTOR

(75) Inventors: Ricardo Morron Lluch, Barcelona (ES); Antonio Garcia Espinosa, Barcelona (ES); Xavier Alabern Morera, Vic (BNA) (ES); Jose Muñoz Galian, Barcelona (ES)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 11/283,266

(22) Filed: Nov. 17, 2005

(65) Prior Publication Data

US 2006/0098375 A1 May 11, 2006

Related U.S. Application Data

(63) Continuation of application No. PCT/ES2004/000494, filed on Nov. 5, 2004.

(51) Int. Cl.
*H01H 47/00* (2006.01)
*H02H 3/00* (2006.01)
*H02H 7/00* (2006.01)

(52) U.S. Cl. .............................. 361/139; 361/5; 361/6; 361/7

(58) Field of Classification Search ................. 361/139, 361/5–7
See application file for complete search history.

(56) References Cited

U.S. PATENT DOCUMENTS 4,720,761 A * 1/1988 Saletta et al. ............... 361/152
4,720,763 A 1/1988 Bauer .......................... 361/154
4,739,293 A 4/1988 Hurley ........................ 336/132
4,748,343 A 5/1988 Engel .......................... 307/135
4,833,565 A 5/1989 Bauer .......................... 361/154
4,893,102 A 1/1990 Bauer .......................... 335/132
5,050,172 A 9/1991 Elms et al. ..................... 371/66
5,128,825 A 7/1992 Hurley ........................ 361/154

(Continued)

FOREIGN PATENT DOCUMENTS

DE 195 44 207 C2 6/1997

(Continued)

OTHER PUBLICATIONS

Rahman, M.F., et al., "A Sensorless Position Estimator for a Nonlinear Solenoid Actuator", Institute of Electrical and Electronic Engineers, 1995, pp. 1208-1213.

(Continued)

*Primary Examiner*—Michael J Sherry
*Assistant Examiner*—Dharti H Patel

(57) ABSTRACT

A contactor having a separable conduction path, an actuator, a magnetic stator and armature, and a controller, is disclosed. The actuator is in mechanical communication with the separable conduction path, and the magnetic stator and magnetic armature are arranged in field communication with each other and with an excitation coil responsive to a coil current that serves to generate a magnetic field directed to traverse the stator and the armature. The controller has a processing circuit adapted to control the coil current in response to the current and voltage at the coil such that the coil current is controlled in response to the position and closing speed of the separable conduction path prior to the separable conduction path closing during an open-to-close action.

17 Claims, 8 Drawing Sheets

U.S. PATENT DOCUMENTS

| | | | | |
|---|---|---|---|---|
| 5,424,637 | A | 6/1995 | Oudyn | 324/207.16 |
| 5,627,444 | A * | 5/1997 | Fulks | 318/701 |
| 6,196,172 | B1 * | 3/2001 | Cosfeld et al. | 123/90.11 |
| 6,208,497 | B1 * | 3/2001 | Seale et al. | 361/160 |
| 6,249,418 | B1 | 6/2001 | Bergstrom | 361/152 |
| 6,291,911 | B1 * | 9/2001 | Dunk et al. | 307/137 |
| 6,417,749 | B1 * | 7/2002 | Kappel et al. | 335/132 |
| 6,657,847 | B1 * | 12/2003 | Wright et al. | 361/160 |

FOREIGN PATENT DOCUMENTS

| | | | |
|---|---|---|---|
| EP | 0 694 944 | A1 | 1/1996 |
| EP | 1 069 284 | A2 | 1/2001 |
| WO | WO 01/41174 | A1 | 6/2001 |

OTHER PUBLICATIONS

Roschke, Thomas, "Electronic Control of Electromagnetic Contractors", Proceedings of 19th Int. Conf. on Electric Contact Phenomena, ICEC '98, Sep. 14-17, 1998, Nuremberg, Germany, pp. 295-299.

International Search Report, O.E.P.M., Mar. 28, 2005 (3 pages).

* cited by examiner

APPARATUS AND METHOD OF CONTROLLING THE CLOSING ACTION OF A CONTACTOR

CROSS REFERENCE TO RELATED APPLICATIONS

This application is a continuation application of, and claims the benefit of priority under 35 U.S.C. 120 to, International Patent Application No. PCT/ES2004/000494, filed Nov. 5, 2004, the entire contents of which are hereby incorporated by reference.

BACKGROUND OF THE INVENTION

The present disclosure relates generally to electrical contactors, and particularly to controlling the closing action thereof.

Contactors for motor, lighting, and general purpose applications are generally designed with one or more power contacts that change state by energizing and de-energizing an excitation coil. Contactors may be configured with a single pole or with a plurality of poles, and may include both normally open and normally closed contacts. In a contactor employing normally open contacts, energization of the coil results in closure of the contacts. The nature of a contactor application tends to result in tens of thousands or even millions of close and open operations over the life of the contactor. As such, attention is paid to the mechanical attributes of the contactor that enables such duty of operation. In the event that the contactor closes and opens onto an energized electrical circuit, not only do the contacts experience a mechanical duty, but they also experience an electrical duty, which manifests itself in the formation of an electrical arc. During the closing of a normally open contactor, the dynamics of the closing action tends to result in contact bounce at the point of closure, which under a load condition may result in multiple electrical arcs being drawn and extinguished, which in turn tends to increase the degree of wear at the contacts and reduce the life expectancy of the contacts. While present contactors may be suitable for their intended purpose, there remains a need in the art for an electrical contactor that provides for reduced contact wear and increased contactor life.

BRIEF DESCRIPTION OF THE INVENTION

Embodiments of the invention include a contactor having a separable conduction path, an actuator, a magnetic stator and armature, and a controller. The actuator is in mechanical communication with the separable conduction path, and the magnetic stator and magnetic armature are arranged in field communication with each other and with an excitation coil responsive to a coil current that serves to generate a magnetic field directed to traverse the stator and the armature. The controller has a processing circuit adapted to control the coil current in response to the current and voltage at the coil such that the coil current is controlled in response to the position and closing speed of the separable conduction path prior to the separable conduction path closing during an open-to-close action.

Other embodiments of the invention include a method of controlling the closing action of a contactor having a stator, an armature, and an excitation coil. Initial values of coil resistance and inductance are calculated; an instantaneous coil inductance of the contactor is calculated; an instantaneous position of the armature with respect to the stator is calculated in response to the calculated instantaneous coil inductance; an instantaneous speed of the armature is calculated with respect to the stator; and, a coil current is calculated in response to the instantaneous position and speed of the armature such that the instantaneous speed of the armature tends toward a target speed characteristic.

BRIEF DESCRIPTION OF THE DRAWINGS

Referring to the exemplary drawings wherein like elements are numbered alike in the accompanying Figures.

DETAILED DESCRIPTION OF THE INVENTION

An embodiment of the invention provides a controller for an electrical contactor that controls the current to the coil of the contactor such that the closing speed of the armature relative to the stator is kept within predetermined limits prior to closure, thereby reducing the contact bounce on closure. As a result, and in the event that the contactor is connected to a powered load, less contact erosion at the separable conduction path of the contactor is possible.

Figure 1:
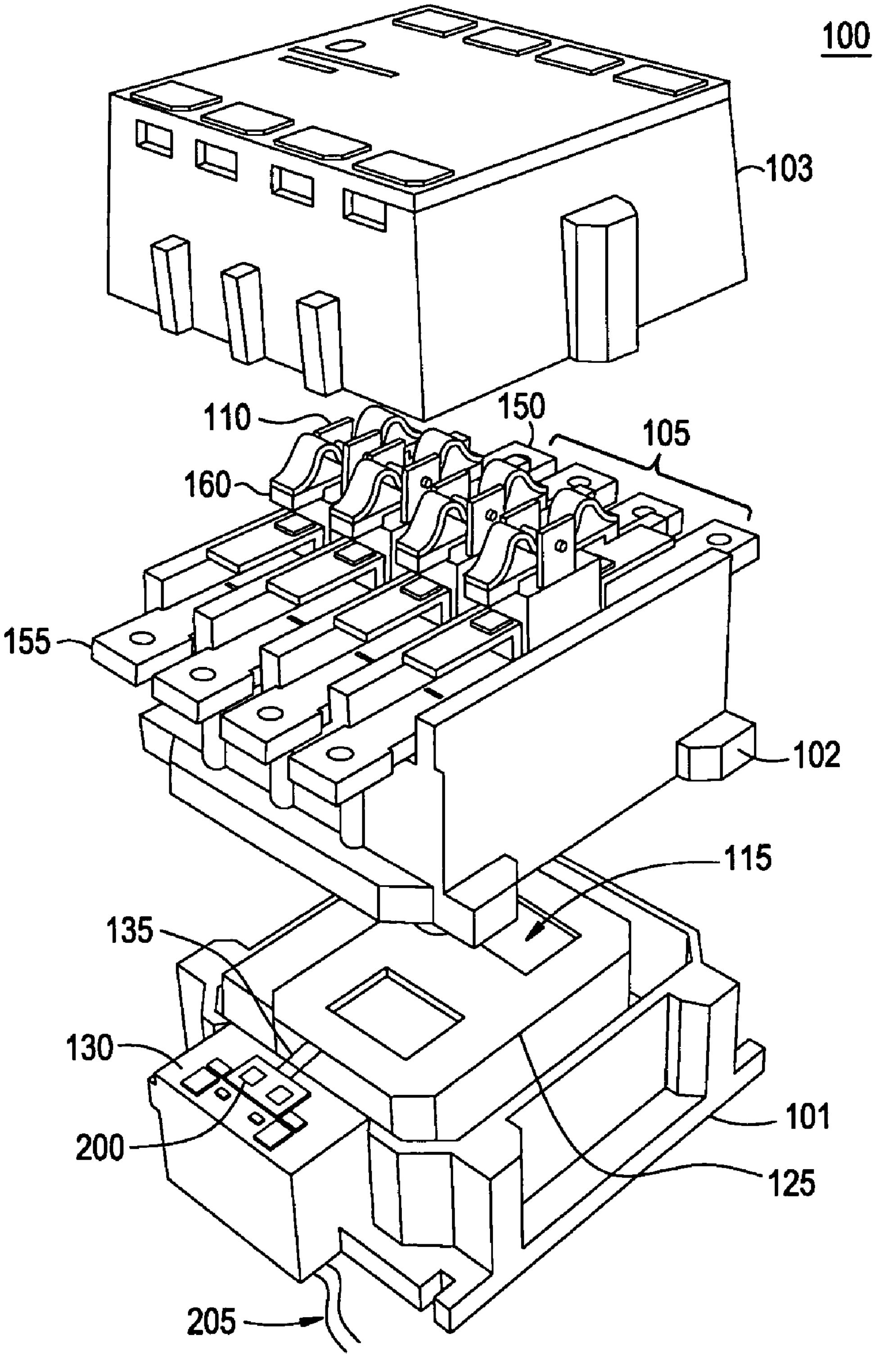
FIG. 1 depicts an exemplary contactor in exploded isometric view for use in accordance with embodiments of the invention.
Figure 2:
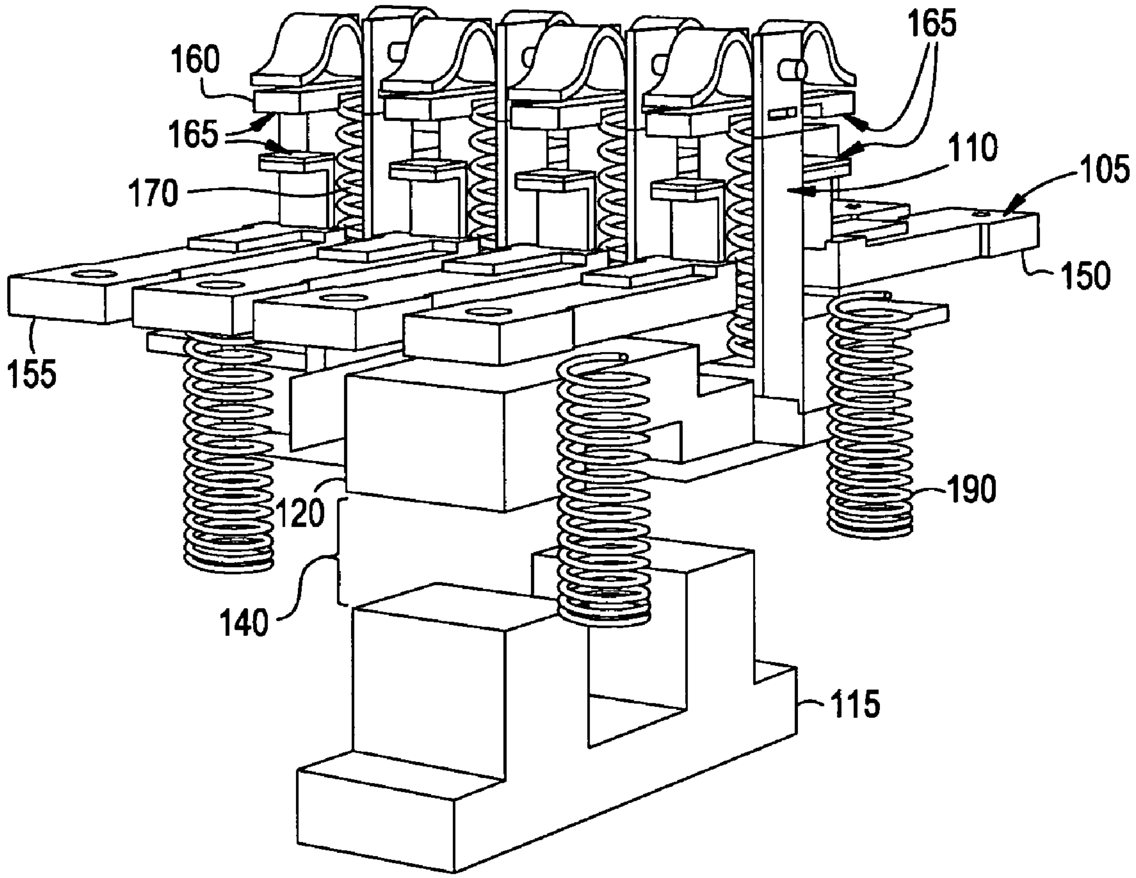
FIG. 2 depicts a partial isometric view of some of the components depicted in FIG. 1.
Figure 3:
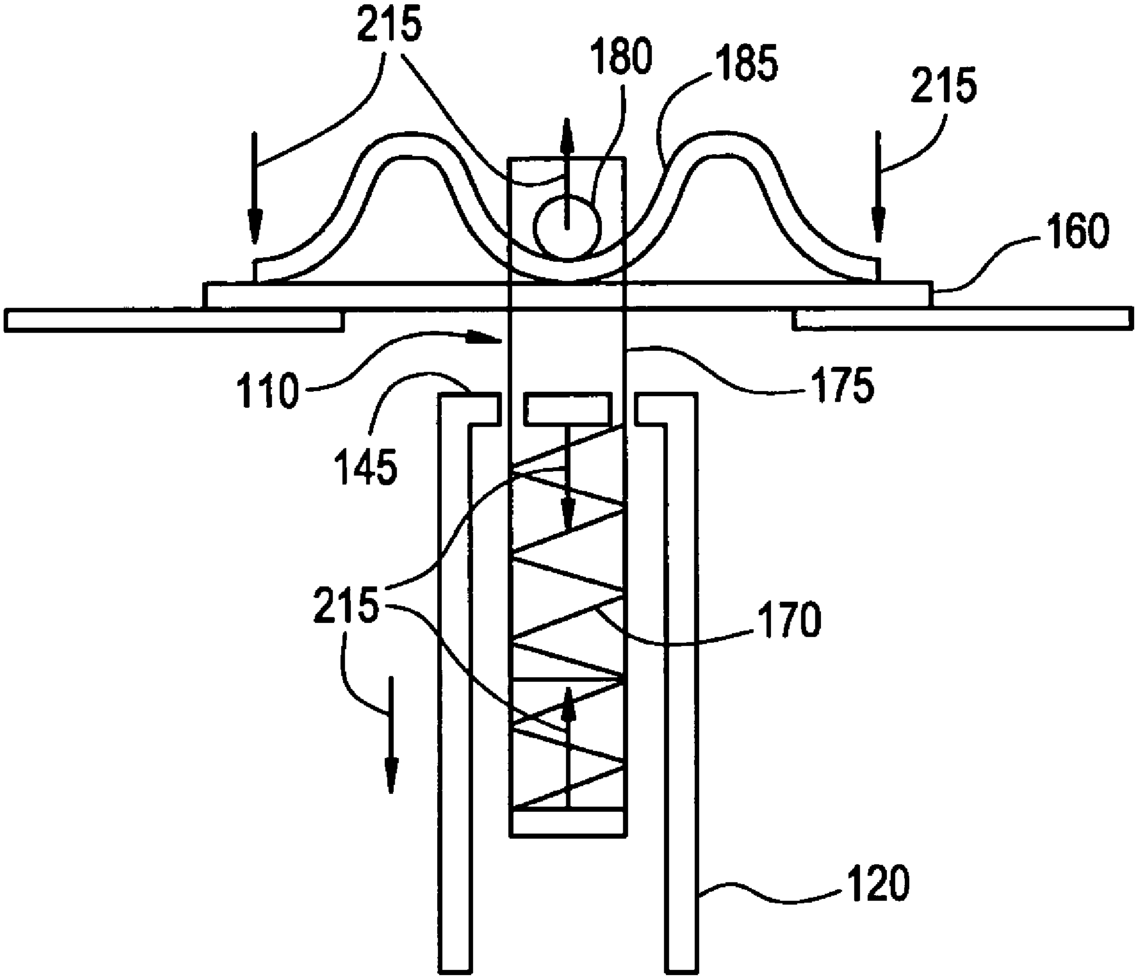
FIG. 3 depicts a partial side view of some of the components depicted in FIG. 2.

FIG. 1 is an exemplary embodiment of a contactor 100 having a bottom section 101, a mid-section 102, and a cover 103. Within contactor 100 is a separable conduction path 105, an actuator 110 in mechanical communication with the separable conduction path 105, a magnetic stator 115, a magnetic armature 120, an excitation coil 125, and a controller 130, best seen by also referring to FIG. 2. Excitation coil 125 is responsive to a coil current from leads 135 that serve to generate a magnetic field directed to traverse the stator 115 and armature 120 across an air gap 140, thereby putting stator 115 and armature 120 in field communication with each other. Armature 120 and actuator 110 are coupled via a bridge 145 (best seen by referring to FIG. 3), such that actuator 110 and armature 120 move up and down together as armature 120 moves under the influence of the aforementioned magnetic field to increase and decrease the air gap 140. Separable conduction path 105 includes a line strap 150, a load strap 155, and a contact arm 160. A pair of contacts 165 at each end of contact arm 160 provide for repetitive making and breaking (closing and opening) of the separable conduction path 105, whether contactor 100 is under an electrical load or not. Actuator 110 is mechanically coupled to contact arm 160 via contact springs 170 and guide arm 175, which couples to contact arm 160 via pin 180. A pickup surface 185 on contact arm 160 provides a means for distributing the contact force during a closing action. The arrows 215 illustrated in FIG. 3 depict the relative motion of the various components of contactor 100 as armature 120 moves down.

During a closing action, via a coil current from controller 130, which will be discussed in more detail below, armature 120 closes air gap 140 as it is attracted toward stator 115 under the influence of the aforementioned magnetic field, and actuator 110 and contact arm 160 move in unison toward line and load straps 150, 155 until the pairs of contacts 165 touch. Upon closure of the contacts 165, actuator 110 is overdriven slightly to compress contact springs 170, thereby providing a contact force and a contact depression at the pairs of contacts 165. As a result of dynamic forces between the pairs of contacts 165 during contact closure, contact bounce may occur. However, as will be discussed in more detail below, embodiments of the invention provide a degree of control to reduce this contact bounce.

During an opening action resulting from the reduction or removal of coil current in leads 135, contact springs 170 and armature return spring 190 drive armature 120, actuator 110, and contact arm 160 upward, thereby separating contact pairs 165.

To reduce contact bounce during closure, controller 130 includes a processing circuit 200 that is adapted, that is, configured with electronics and electronic circuitry, to control the coil current in response to the current and voltage at the coil 125, such that the coil current is reduced prior to the separable conduction path 105 closing during an open-to-close action. Furthermore, the processing circuit 200 is adapted to control the coil current independent of an auxiliary sensor other than the current and voltage sensing (detection) circuitry that may be integral to processing circuit 200. In an embodiment, processing circuit 200 is powered via external leads 205.

Figure 4A:
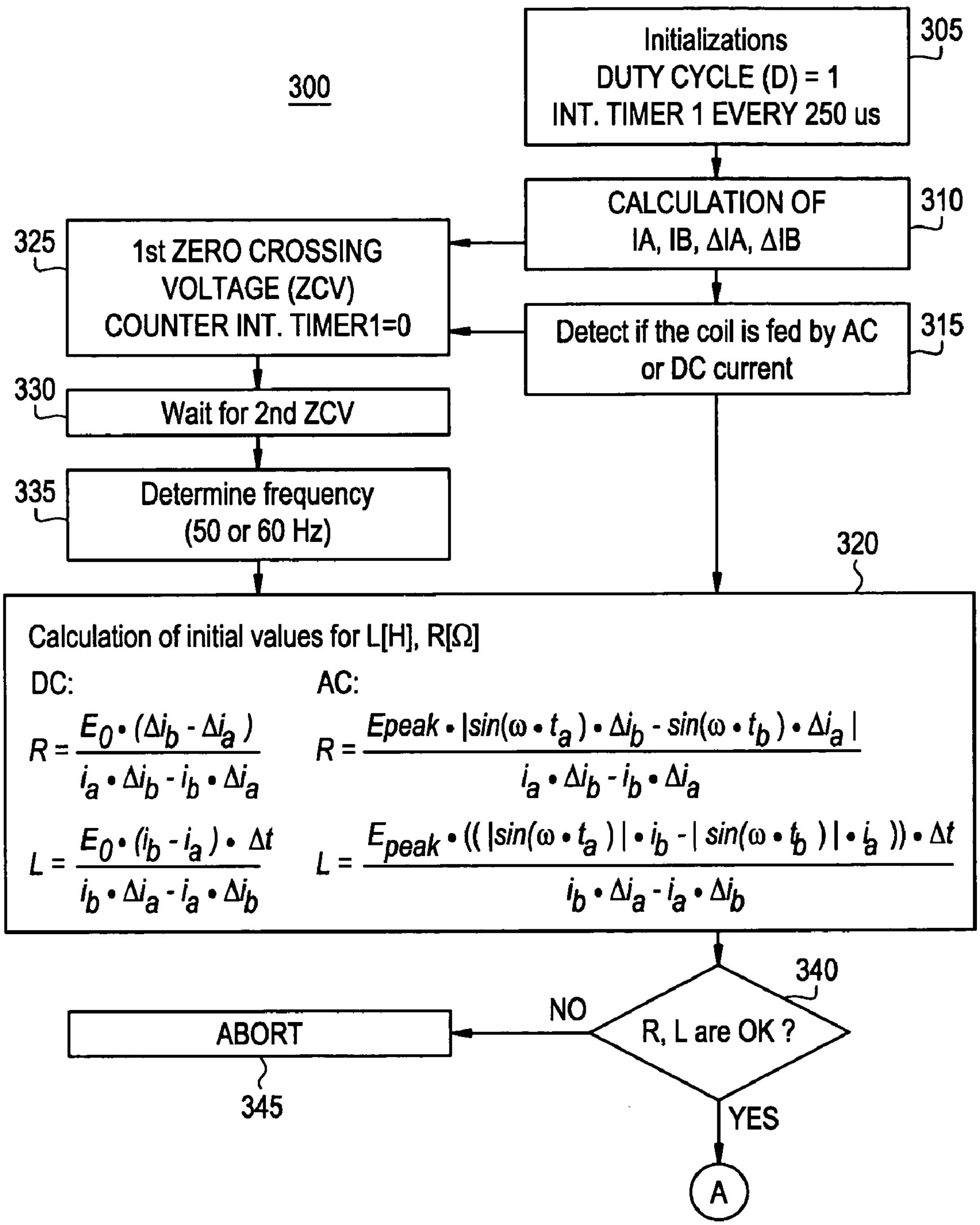
FIGS. 4A and B depict an exemplary process flow diagram for practicing embodiments of the invention.
Figure 4B:
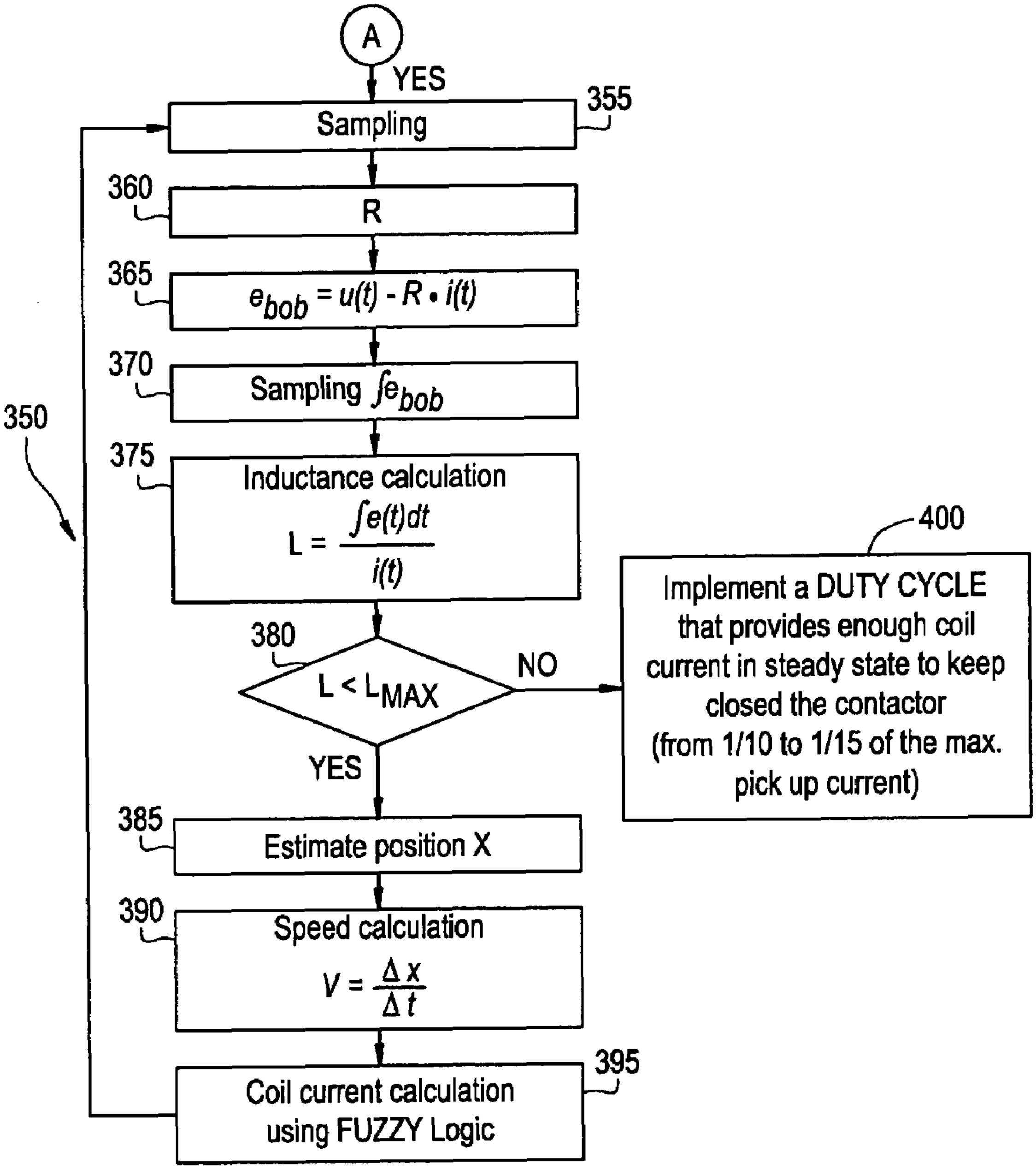

The manner in which processing circuit 200 controls the coil current will now be discussed with reference to the method 300 depicted by the flow chart of FIG. 4. In general, method 300 serves to control the armature speed, or keep it within predetermined limits, at a time prior to the separable conduction path 105 closing during an open-to-close action. Accordingly, the position of armature 120 relative to stator 115 during the closing action needs to be calculated, or estimated. Since no external sensors are used for this calculation, the position of armature 120 is determined using the electrical parameters of coil current and voltage.

As a result of contactor 100 not having an external sensor, calculation of the initial coil resistance R (once current starts to flow in coil 125) is needed. Furthermore, calculation of the initial coil inductance L, and comparison with its standard operating value, allows detection of coil abnormalities like an open circuit condition (coil winding broken) or a reduced coil turns condition (short-circuited coil). These calculations are done by sampling the currents $I_a$ and $I_b$ at two different times within the first half cycle in the case of an alternating current. Typical sampling times are about $t_a$=2.5 ms (milliseconds) and about $t_b$=5.5 ms. These sampling times also apply for direct current calculations. In an embodiment, several samples are acquired at times very close to the aforementioned ones, and the mean values are used in order to avoid the risk of getting erroneous values of the currents $I_a$ and $I_b$ due to electrical noise.

At block 305, a duty cycle control parameter is set to 1, and a timer acting as a clock for defining the sampling frequency is initialized. At block 310, the currents Ia and Ib are measured at the two aforementioned times $t_a$ and $t_b$, and the change in currents ΔIa and ΔIb are calculated. Depending on whether the coil 125 is fed by AC (alternating current) or DC (direct current) power, as determined at block 315, or whether a voltage zero crossing is detected during the calculations at block 310, the control logic may pass directly to block 320 or to block 325. At blocks 325, 330 and 335, first and second zero crossing voltages are detected and the frequency of the AC power is determined.

At block 320, the initial values for coil inductance L in Henries (H) and coil resistance R in ohms (Ω) are calculated according to the equations provided, which depends on whether coil 125 is powered by AC or DC. In the equations of block 320, Eo is the DC voltage, Epeak is the peak AC voltage, ω is the radian frequency of the AC power, and t is time. At block 340, it is determined whether the initial coil resistance R and initial coil inductance L are indicative of an open contactor condition and/or a faulty coil. If no, then control logic passes to block 345 where the algorithm is aborted. If yes, then control logic passes to calculation loop 350, which begins at block 355 where the instantaneous coil current and voltage are sampled for each iteration through loop 350.

Once the initial values of R and L have been calculated and there is no abort condition, control logic passes to blocks 360, 365, 370 and 375, where the coil back electromotive force $e_{bob}$, a sampling of the integral of $e_{bob}$, and the coil inductance L, are calculated for each iteration. Here, u(t) is the voltage across the coil 125, i(t) is the current through the coil 125, R is the initial coil resistance and e(t) is an abbreviation for $e_{bob}(t)$.

In an R-L circuit, the voltage across the coil 125 may be derived from:

$$u(t) = R\cdot i(t) + L\cdot\frac{di(t)}{dt} + i(t)\cdot\frac{dL}{dt}. \qquad \text{Equation-1}$$

However, to determine the inductance L from this equation may be difficult as the derivative terms like di(t)/dt may include system noise, which is difficult to avoid. Accordingly, embodiments of the invention determine the coil inductance L using the coil back electromotive force and the current through the coil at any time using the following equation:

$$L = \frac{\int_0^t (U - R\cdot i_{bob})\cdot dt}{i_{bob}(t)} = \frac{\int_0^t e_{bob}}{i_{bob}(t)}, \qquad \text{Equation-2}$$

which is synonymous with the equations of blocks 365 and 375, where U refers to u(t), and $i_{bob}$ and $i_{bob}(t)$ refer to i(t).

At block 380, it is determined whether the instantaneous coil inductance L is less than a threshold maximum Lmax, which is indicative of whether the armature 120 is nearing closure or not. That is, as the armature 120 nears closure, the instantaneous coil inductance L rises, then peaks and decreases due to iron core saturation (as seen in FIG. 3, which is discussed in more detail later). Thus, by comparing the instantaneous coil inductance L to the threshold maximum Lmax, processing circuit 200 may determine when an armature closure condition is nearing.

If L<Lmax, then control logic passes to block 385, where the position x of armature 120 relative to stator 115 is calculated, or estimated. Theoretically, the coil inductance is a function of the armature position and the coil current, which may be derived from:

$$L = \frac{N^2}{\frac{1}{s}\left[\frac{l_F + l_M + l_T + 0.0005N\cdot i}{0.0011} + \frac{2x}{\mu_o}\right]} + K_R, \qquad \text{Equation-3}$$

where N is the number of turns in the coil 125, $l_M$ is the path length of the magnetic field through the armature 120, $l_F$ is the path length of the magnetic field through the stator 115, $l_T$ is the path length of the magnetic field through a fixed air gap 140, s is the cross section of the magnetic path, $K_R$ is a constant related to the initial value of coil inductance, $\mu_0$ is the permeability of free space, and x is the position of armature 120 relative to stator 115. By rearranging Equation-3, the position x of armature 120 may be obtained from:

$$x = \frac{\mu_o}{2}\left[\frac{N^2 \cdot s}{L - K_R} - \frac{l_F + l_M + l_T + 0.0005N \cdot i}{0.0011}\right]. \qquad \text{Equation-4}$$

At block 390, the speed (V) of armature 120 relative to stator 115 is determined by taking the derivative of Equation-4, or in finite difference terms, by taking the incremental difference in x relative to t, ($\Delta x/\Delta t$), from one iterative step to the next.

In an alternative embodiment, processing circuit 200 is further adapted to estimate the acceleration of the armature 120 relative to the stator 115 in response to the current and voltage at the coil 125 by taking the derivative of the velocity.

At block 395, a desired coil current is calculated using fuzzy logic control that results in an armature closing speed that more closely matches a target closing speed characteristic, which is a predetermined desirable closing speed that results in reduced contact bounce and is stored in a memory 210 at controller 130. At each iteration, the actual armature closing speed is calculated according to the aforementioned method 300 and compared to the desired armature closing speed in memory 210 for that instantaneous position of the armature. If the actual speed of the armature is too high or too low, then the coil current is adjusted accordingly to either slow down or speed up the armature. At the next iteration, a similar comparison is made and a similar adjustment is made, thereby resulting in a change in coil current such that the armature closing speed is iteratively adjusted to more closely match the target closing speed characteristic that is stored in memory 210. As a result, the adjusted coil current results in a closing speed of the armature 120 at the point of closure of the contacts 165 that is less than the closing speed would have been in the absence of the adjusted coil current, and the reduced closing speed of the armature at the point of closure of the contacts results in less contact bounce at closure than would have resulted in the absence of the adjusted coil current. Here, the adjusted coil current is referred to as having been adjusted from a first value to a lesser second value, where the second value results in less contact bounce at the separable conduction path during an open-to-close action than would have occurred with the first value of coil current.

If at block 380 it is determined that the coil inductance L is equal to or greater than the threshold value Lmax, which signifies that the magnetic circuit is closed, which means that the moving armature 120 is touching the magnetic stator 115, then control logic passes to block 400 where a coil current duty cycle is calculated and implemented such that the coil current is reduced in order to save energy and reduce the rise of coil temperature, and such that there is enough coil current in the steady state condition to keep the contacts 165 of contactor 100 closed. In an embodiment, the coil current duty cycle is from about 1/10 to about 1/15 of the maximum pickup current of the coil 125.

Figure 5:
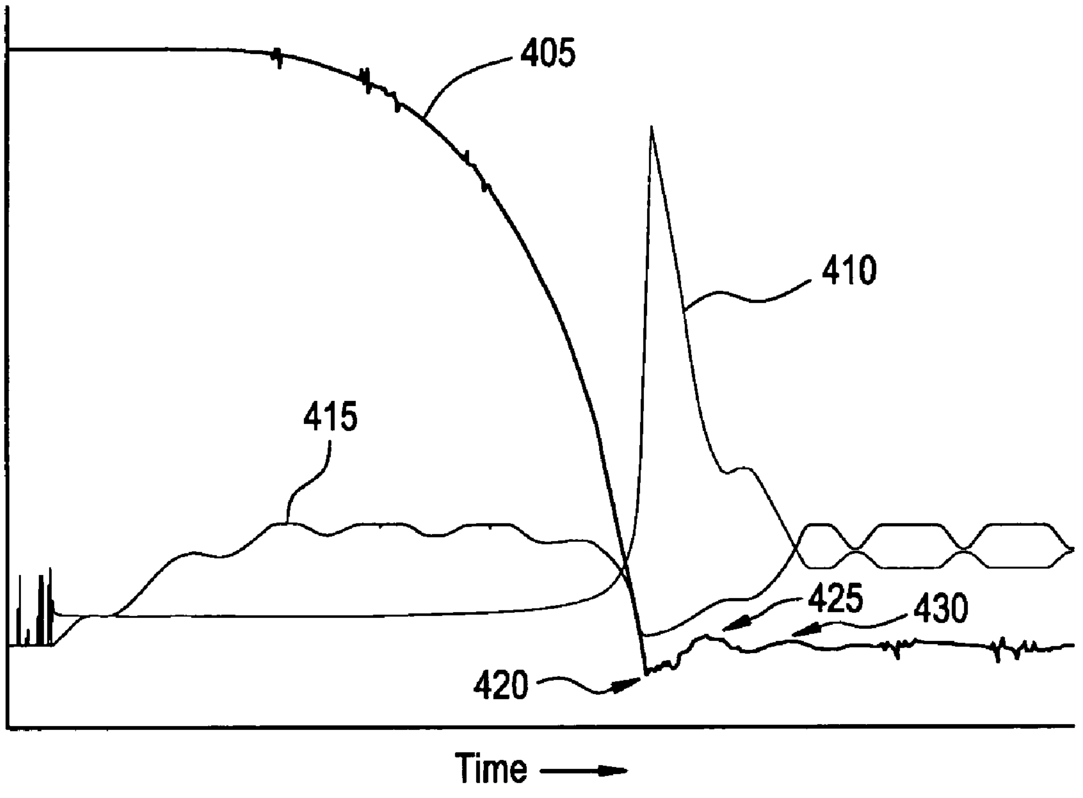
FIGS. 5 and 7 depict exemplary empirical data of an exemplary contactor operating in the absence of embodiments of the invention.
Figure 6:
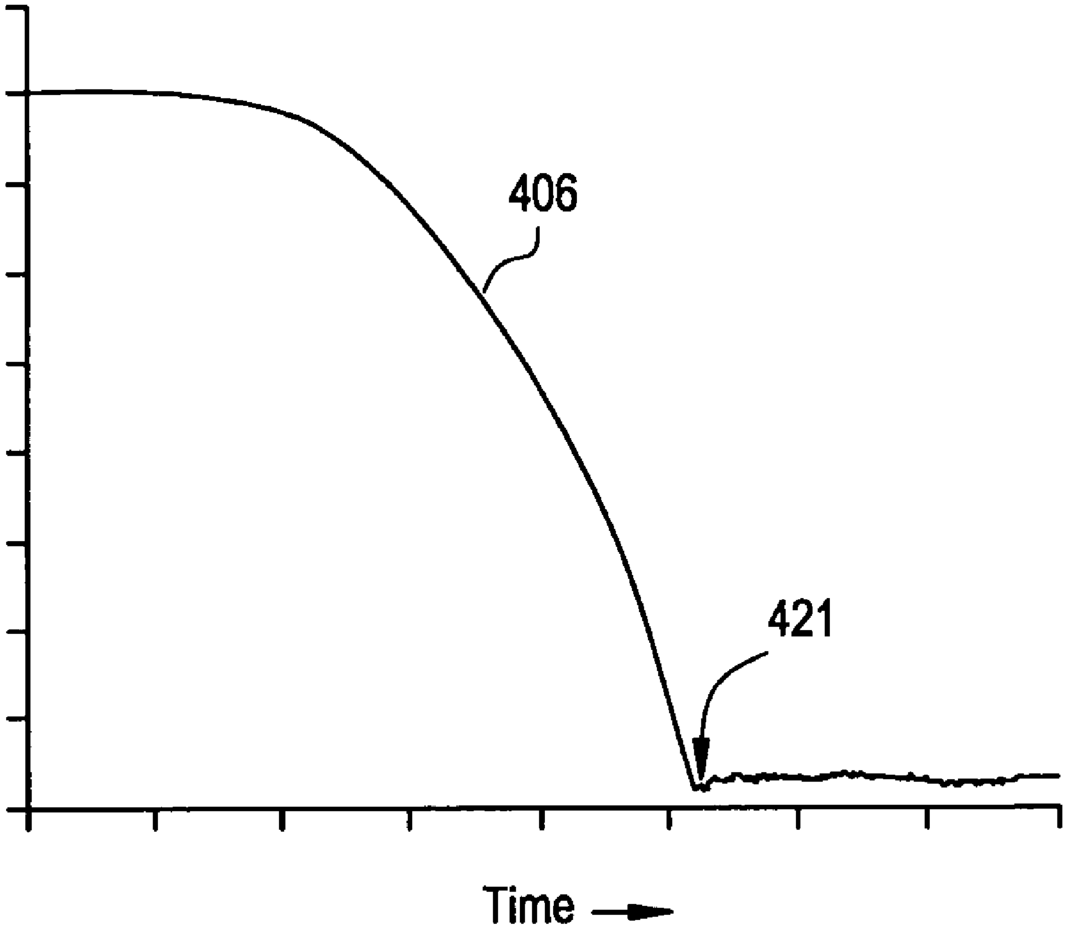
FIGS. 6 and 8 depict exemplary empirical data of an exemplary contactor operating in accordance with embodiments of the invention.
Figure 7:
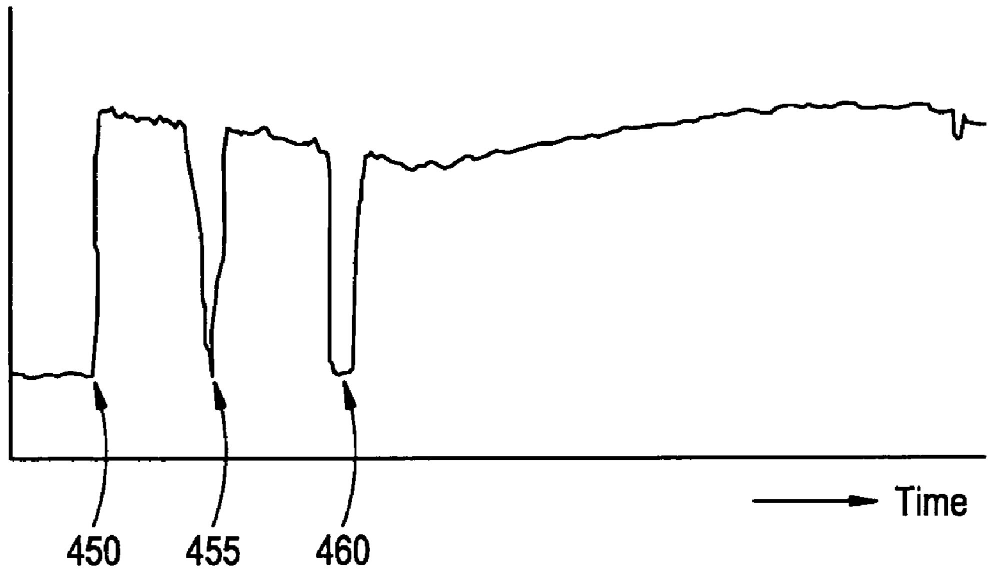
Figure 8:
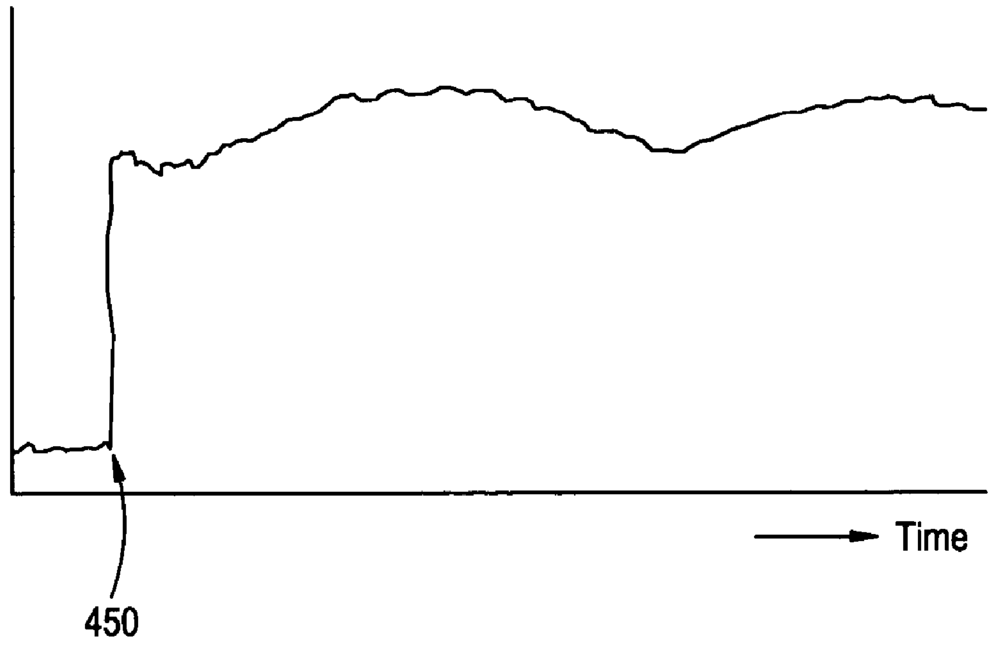

Referring now to FIGS. 5-8, exemplary empirical data of a contactor 100 operating in accordance without (FIGS. 5 and 7) and with (FIGS. 6 and 8) embodiments of the invention are depicted. FIGS. 5 and 6 have the same scale for the ordinate and abscissa, with the abscissa being time and the ordinate, in one instance, being displacement x. FIGS. 7 and 8 have the same scale for the ordinate and abscissa, with the abscissa being time and the ordinate being a signal representative of continuity across a set of closed contacts 165.

Referring first to FIGS. 5 and 6, the position x of armature 120 is depicted by curve 405 (FIG. 5) and curve 406 (FIG. 6), the inductance L of coil 125 is depicted by curve 410, and the coil current (i) is depicted by curve 415. Stopping of the armature 120 with respect to the stator 115 is seen at the abrupt change in the characteristic of curve 405, 406 depicted at numeral 420 (FIG. 5) and numeral 421 (FIG. 6). Following armature closure, a plurality of rises and falls is seen in curve 405, but is not seen in curve 406, indicating a contact bounce condition in FIG. 5, as depicted at numerals 425 and 430.

A clearer comparison of contact bounce with and without embodiments of the invention is best seen by now referring to FIGS. 7 and 8, where FIG. 7 is illustrative of contact closure in a contactor 100 operating in the absence of embodiments of the invention, and FIG. 8 is illustrative of contact closure in a contactor 100 operating in accordance with embodiments of the invention. In both FIGS. 7 and 8, the initial point of contact closure is represented by numeral 450, which is the point in time where continuity at contacts 165 is established on closure and is signified by a positive change in the illustrated signal. As depicted in FIG. 7, a loss of continuity is seen to occur at two points 455, 460 after the initial closure of contact arm 160, which signifies the occurrence of count bounce (twice). In comparison, FIG. 8 illustrates an absence of a loss of continuity and therefore an absence of contact bounce.

In comparing FIGS. 7 and 8, it can be seen that embodiments of the invention have improved the closing dynamics of the contactor 100, thereby resulting in reduced mechanical bouncing at the contacts 165. When the contactor is loaded, and as a result of this reduction in contact bouncing, the electrical arcs between the contacts 165 are also reduced, thereby increasing the life of the contactor 100. Since the control logic of method 300 is of a closed-loop type, the calculated speed profile and impact speed at the contacts 165 and the magnet armature 120 during a closing action are empirical values that take into account power supply voltage changes, mechanical wear of contactor parts, changes in friction, spring constant ageing, and other external disturbances, thereby resulting in a control scheme that is self adjusting to changing conditions.

While embodiments of the invention have been described employing a particular structure for the contactor 100, it will be appreciated that the scope of the invention is not so limited, and that the invention also applies to a contactor having a different structure, such as a single pair of contacts 165, or a multitude of pairs of contacts 165, for example.

An embodiment of the invention may be embodied in the form of computer-implemented processes and apparatuses for practicing those processes. The present invention may also be embodied in the form of a computer program product having computer program code containing instructions embodied in tangible media, such as floppy diskettes, CD-ROMs, hard drives, USB (universal serial bus) drives, or any other computer readable storage medium, wherein, when the computer program code is loaded into and executed by a computer, the computer becomes an apparatus for practicing the invention. The present invention may also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing the invention. When implemented on a general-purpose microprocessor, the computer program code segments configure the microprocessor to create specific logic circuits. The technical effect of the executable instructions is to control the closing action of a contactor such that contact erosion of the contactor under load is lessened.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A contactor, comprising:

a separable conduction path comprising a moveable contact arm electrically separable from a stationary conduction strap;

an actuator in mechanical communication with the separable conduction path;

a magnetic stator and a magnetic armature arranged in field communication with each other and with an excitation coil responsive to a coil current that serves to generate a magnetic field directed to traverse the stator and the armature; and a controller having a processing circuit adapted to control the coil current in response to the current and voltage at the coil such that the coil current is controlled in response to the position and closing speed of the separable conduction path prior to the separable conduction path closing during an open-to-close action;

wherein the processing circuit is further adapted to estimate the speed of the armature relative to the stator in response to the current and voltage at the coil and to compare the estimated speed of the armature with a predetermined target speed characteristic stored in a memory.

2. The contactor of claim 1, wherein:

the processing circuit is further adapted to control the coil current in response to the coil current and voltage and independent of any auxiliary sensor.

3. The contactor of claim 1, wherein:

the processing circuit is further adapted to estimate the position of the armature relative to the stator in response to the current and voltage at the coil.

4. The contactor of claim 3, wherein:

the processing circuit is further adapted to estimate the speed of the armature relative to the stator in response to the current and voltage at the coil.

5. The contactor of claim 4, wherein:

the processing circuit is further adapted to estimate the acceleration of the armature relative to the stator in response to the current and voltage at the coil.

6. The contactor of claim 4, wherein:

the processing circuit is further adapted to compare the estimated speed of the armature with a target speed characteristic.

7. The contactor of claim 6, wherein:

the processing circuit is further adapted to adjust the coil current in response to the estimated armature speed and the target armature speed characteristic such that the closing speed of the armature more closely matches the target speed characteristic.

8. The contactor of claim 7, wherein:

the separable conduction path comprises a pair of electrical contacts;

the adjusted coil current results in a closing speed of the armature at closure of the contacts that is less than the closing speed would be in the absence of the adjusted coil current; and the reduced closing speed of the armature at closure of the contacts results in less contact bounce at closure than would result in the absence of the adjusted coil current.

9. The contactor of claim 1, wherein:

the processing circuit is further adapted to calculate coil resistance and coil inductance in response to the coil current and voltage.

10. The contactor of claim 9, wherein:

the processing circuit is further adapted to calculate the position of the armature relative to the stator in response to the calculated coil inductance.

11. The contactor of claim 10, wherein:

the processing circuit is further adapted to calculate a coil current duty cycle such that sufficient coil current is provided to keep closed the separable conduction path during a closed steady state condition.

12. A method of controlling the closing action of a contactor having a stator, an armature, a separable conduction path operably connected to the armature, and an excitation coil for magnetically exciting the stator and armature for opening and closing the separable conduction path, the method comprising:

calculating initial values of coil resistance and inductance;

calculating an instantaneous coil inductance of the contactor;

calculating an instantaneous position of the armature with respect to the stator in response to the calculated instantaneous coil inductance;

calculating an instantaneous speed of the armature with respect to the stator; and calculating a coil current in response to the instantaneous position and speed of the armature such that the instantaneous speed of the armature tends toward a target speed characteristic;

wherein the calculating a coil current comprises:

comparing the calculated instantaneous speed of the armature to a predetermined target speed characteristic stored in a memory;

calculating a coil current that is adjusted from a first value to a lesser second value, the second value resulting in less contact bounce at the separable conduction path during an open-to-close action than would occur with the first value;

calculating a coil current duty cycle by determining the calculated instantaneous coil inductance to be equal to or greater than a threshold value, thereby providing sufficient coil current to keep closed the separable conduction path during a closed steady state condition; and adjusting the first value to the lesser second value based upon the comparing.

13. The method of claim 12, wherein the calculating an instantaneous coil inductance comprising:

sampling an instantaneous coil current and voltage;

calculating an instantaneous inductive voltage in response to the instantaneous coil voltage and an instantaneous resistive voltage drop across the coil; and calculating an instantaneous coil inductance in response to an integration of a sampling of the instantaneous inductive voltage.

14. The method of claim 12, wherein the coil current duty cycle is reduced to a value such that the contactor is kept closed.

15. The method of claim 12, further comprising:

calculating an initial coil resistance and an initial coil inductance of the contactor.

16. The method of claim 15, further comprising:

sampling an instantaneous coil current and voltage and calculating a coil current duty cycle in response to the initial coil resistance and initial coil inductance being indicative of an open contactor absent a coil abnormality.

17. The contactor of claim 11, wherein:

the sufficient coil current at the calculated coil current duty cycle is lower than the coil current at a maximum pickup current of the coil, thereby saving energy and reducing a temperature rise of the coil.

* * * * *